United States Patent
Barancyk et al.

[11] Patent Number: 5,922,475
[45] Date of Patent: Jul. 13, 1999

[54] COLOR-PLUS-CLEAR COMPOSITE COATING COMPOSITIONS CONTAINING ALKYLOLATED OR ETHERIFIED CARBANATE FUNCTIONAL POLYMERS

[75] Inventors: Steven V. Barancyk, Wexford; Leigh-Ann Humbert, Allison Park, both of Pa.

[73] Assignee: PPG Industries Ohio, Inc., Cleveland, Ohio

[21] Appl. No.: 08/846,521

[22] Filed: Apr. 29, 1997

[51] Int. Cl.$^6$ .............. C08L 61/20; C08L 67/02
[52] U.S. Cl. .............. 428/482; 428/522; 428/524; 525/162; 525/163; 525/443; 525/515
[58] Field of Search ............... 525/162, 163, 525/131, 443, 515; 428/482, 522, 524

[56] References Cited

U.S. PATENT DOCUMENTS

| | | | |
|---|---|---|---|
| 3,464,938 | 9/1969 | Nordstrom | 260/21 |
| 3,479,328 | 11/1969 | Nordstrom | 260/86.1 |
| 4,543,276 | 9/1985 | Parekh | 427/388.3 |
| 5,356,669 | 10/1994 | Rehfuss et al. | 427/407.1 |
| 5,451,656 | 9/1995 | Menovcik et al. | 528/288 |
| 5,508,379 | 4/1996 | Menovcik et al. | 528/367 |
| 5,532,061 | 7/1996 | Menovcik et al. | 428/423.1 |
| 5,593,733 | 1/1997 | Mayo | 427/407.2 |
| 5,593,785 | 1/1997 | Mayo et al. | 428/423.1 |

*Primary Examiner*—Patricia A. Short
*Attorney, Agent, or Firm*—William J. Uhl

[57] ABSTRACT

A curable film-forming composition is provided comprising: (i) a polyester polymer or oligomer containing a plurality of carbamate groups of the structure:

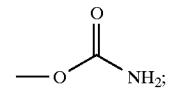

(ii) an alkylolated and optionally etherified carbamate functional acrylic polymer; and (iii) an aminoplast crosslinking agent.

A multi-component composite coating composition is also provided. The coating composition comprises a pigmented film-forming composition serving as a base coat and a clear film-forming composition serving as a transparent coat over the base coat. The transparent coat, or clear coat, is derived from the curable film-forming composition described above.

16 Claims, No Drawings

COLOR-PLUS-CLEAR COMPOSITE COATING COMPOSITIONS CONTAINING ALKYLOLATED OR ETHERIFIED CARBANATE FUNCTIONAL POLYMERS

FIELD OF THE INVENTION

The present invention relates to aminoplast-curable film-forming (coating) compositions, and multi-component composite coating compositions comprising a pigmented or colored base coat and a transparent (clear) coat.

BACKGROUND OF THE INVENTION

Composite coating compositions comprising a colored or pigmented base coat applied to a substrate and a clear coat applied on top of the base coat have become very popular as original finishes for automobiles. The color-plus-clear systems have outstanding gloss and distinctness of image. The clear coat is particularly important for these properties.

Most coating compositions that are used as clear coats in color-plus-clear composite coating systems employ hydroxyl-aminoplast cure mechanisms, well known in coating technology. The popularity of hydroxyl-aminoplast cure coating compositions is due to their low cost, durability, and attractive appearance, but it is widely recognized that such coatings, particularly clear coats, have poor resistance to etching by acid. Acid etch resistance in coatings is becoming an increasingly desirable property, particularly for automotive coatings. High solids aminoplast cured coating systems of the prior art are not highly effective for providing protection against etching caused by acid rain.

Parekh in U.S. Pat. No. 4,543,276, discloses coating compositions containing urethane compounds and any of a number of polymers having any of various functional groups including carbamate. The reference does not disclose the use of such coating compositions as clear coats in color-plus-clear composite coatings, nor does the reference teach any advantage of carbamate functional polymers in coating compositions to improve acid etch resistance.

Nordstrom in U.S. Pat. No. 3,479,328, generally discloses carbamate functional polymers which are modified with aldehyde (alkylolated) and optionally etherified, for use in coating compositions with conventional aminoplast crosslinking agents. The reference does not disclose the use of such coating compositions as clear coats in color-plus-clear composite coatings, nor does the reference teach or suggest any advantage of these polymers in coating compositions to improve acid etch resistance.

SUMMARY OF THE INVENTION

It is an object of the invention to provide a coating composition having improved acid etch resistance, utilizing inexpensive aminoplast technology, suitable for use in a color-plus-clear composite coating system.

In accordance with the present invention, a curable film-forming (coating) composition is provided comprising (i) a polyester polymer or oligomer containing a plurality of terminal or pendant carbamate groups of the structure:

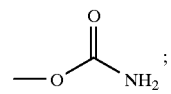

(ii) an acrylic copolymer containing a plurality of groups of the structure:

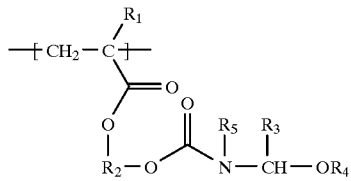

wherein $R_1$, is hydrogen or methyl, $R_2$ is a divalent linking group having about 1 to about 30 carbon atoms, $R_3$ is hydrogen or a lower alkyl group having about 1 to about 10 carbon atoms, and $R_4$ is hydrogen or a lower alkyl group having about 1 to about 6 carbon atoms; $R_5$ is hydrogen or

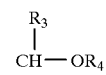

where $R_3$ and $R_4$ are as defined above; and
(iii) an aminoplast crosslinking agent different from (ii) containing methylol groups, methylol ether groups, or mixtures thereof.

A multi-component composite coating composition is also provided. The coating composition comprises a pigmented film-forming composition serving as a base coat and a clear film-forming composition serving as a transparent coat over the base coat. The transparent coat, or clear coat, is derived from the curable film-forming composition described above.

DETAILED DESCRIPTION

The polyesters used in the curable film-forming composition of the present invention may be linear or branched and contain a plurality of terminal or pendant carbamate groups of the structure:

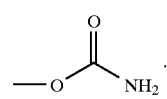

Such polyesters may be prepared by the polyesterification of a polycarboxylic acid or anhydride thereof with polyols and/or an epoxide, using techniques and reaction conditions known to those skilled in the art. Usually, the polycarboxylic acids and polyols are aliphatic or aromatic dibasic acids and diols. Transesterification of polycarboxylic acid esters is also possible.

The polyols which are usually employed in making the polyester include dihydric alcohols, such as ethylene glycol, neopentyl glycol, 3-hydroxy-2,2-dimethylpropyl 3-hydroxy-2,2-dimethylpropanoate, hydrogenated Bisphenol A, cyclohexanediol, butyl ethyl propane diol, trimethyl pentane diol, tris hydroxyethyl isocyanurate, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol and the like.

The acid component of the polyester consists primarily of monomeric carboxylic acids or anhydrides thereof having 2 to 18 carbon atoms per molecule. Among the acids which are useful are cycloaliphatic acids and anhydrides such as phthalic acid, isophthalic acid, terephthalic acid, tetrahydrophthalic acid, hexahydrophthalic acid, methylhexahydrophthalic acid, 1,3-cyclohexane dicarboxylic acid, and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. The polyester may include minor amounts of monobasic acids such as benzoic acid, stearic acid, acetic acid, and oleic acid. Also, there may be employed higher carboxylic acids such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate may be used. A particularly preferred polyester is the reaction product of trimethylolpropane, methylhexahydrophthalic anhydride, and 3-hydroxy-2,2-dimethylpropyl 3-hydroxy-2,2-dimethylpropanoate in a 1:2.95:3.01 mole ratio.

Carbamoylation of the polyester; i, e., incorporation of carbamate functional groups into the polyester, may be done by first forming a hydroxyalkyl carbamate which can be condensed with acid functionality on the polyester as in a typical esterification reaction, yielding carbamate functionality. This can be done either during the formation of the polyester in the presence of the other reactants or after formation of the polyester. Carbamate functional groups may also be incorporated into the polyester by reacting a hydroxyl functional polyester with a low molecular weight carbamate functional material via a "transcarbamoylation" process. Such a reaction may be performed at about 130 to about 170° C., and at pressures up to ambient pressure. In this process, a low molecular weight carbamate functional material derived from an alcohol or glycol ether is reacted with free hydroxyl groups of the polyester, yielding a carbamate functional polyester and the original alcohol or glycol ether. The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred. The incorporation of carbamate groups into the polyester may also be achieved by reacting isocyanic acid with a hydroxyl functional polyester.

The polyester polymer or oligomer typically has a number average molecular weight of from about 600 to about 2500, preferably from about 700 to about 1500 as determined by gel permeation chromatography using a polystyrene standard, and a carbamate equivalent weight within the range of about 200 to about 1500, preferably about 300 to about 500, based on equivalents of reactive pendant or terminal carbamate groups. The equivalent weight is a calculated value based on the relative amounts of the various ingredients used in making the polyester and is based on solids of the polyester.

The polyester polymer or oligomer is preferably used in amounts of about 10 to about 75, more preferably about 35 to about 60 percent by weight based on the total weight of resin solids in the film-forming composition. Levels below about 10 percent by weight may compromise the acid etch resistance of the cured coating, whereas levels above 75% may adversely affect humidity resistance.

The curable film-forming composition of the present invention further contains an acrylic copolymer containing a plurality of groups of the structure:

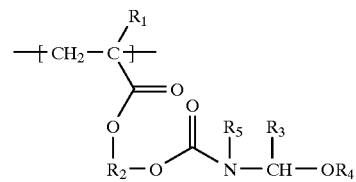

wherein $R_1$ is hydrogen or methyl, $R_2$ is a divalent linking group having about 1 to about 30 carbon atoms, preferably about 2 to about 13, and more preferably about 3 to about 13 carbon atoms, $R_3$ is hydrogen or a lower alkyl group having about 1 to about 10 carbon atoms, and $R_4$ is hydrogen or a lower alkyl group having about 1 to about 6 carbon atoms; $R_5$ is hydrogen or

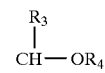

where $R_3$ and $R_4$ are as defined above.

$R_2$ may be linear or branched aliphatic such as alkylene, including methylene, methyl methylene, ethylene, 1- or 2-methyl ethylene, propylene, isomers of dimethyl propylene, butylene, pentylene, and the like; cycloaliphatic; aromatic; aralkylene; or alkarylene; and may be substituted. $R_2$ may include functional linkages such as urethane, ester, amide, and the like. $R_3$ may be hydrogen, which is preferred, or may be linear or branched aliphatic such as alkylene, including methylene, methyl methylene, ethylene, methyl ethylene, propylene, isomers of dimethyl propylene, butylene, pentylene, and the like; cycloaliphatic; aromatic; aralkylene; or alkarylene; and may be substituted. Cyclic groups may include heteroatoms such as nitrogen or oxygen. $R_4$ is preferably a lower alkyl group having about 1 to about 4 carbon atoms.

Acrylic copolymers having groups of structure II may be prepared by polymerizing ethylenically unsaturated monomers that form groups of structure II; i. e., monomers having the structure:

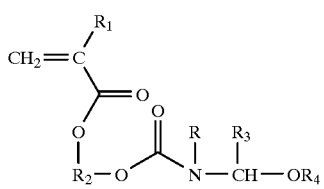

(III)

wherein $R_1$ through $R_5$ are as defined above, with other ethylenically unsaturated monomers. Alternatively, acrylic copolymers having groups of structure II may be prepared by first forming a carbamate functional acrylic copolymer which is alkylolated with an aldehyde and optionally etherified with an alcohol having from about 1 to about 6 carbon atoms.

Monomers of structure III may be prepared by reacting a carbamate functional monomer with an aldehyde (alkylolation) and optionally with an alcohol (etherification). Carbamate functional monomers may be prepared by reacting hydroxyalkyl carbamate with (meth)acrylic acid or anhydride. Carbamate functional monomers may also be prepared by transesterification of (meth)acrylic acid esters with a hydroxyalkyl carbamate using typical esterification reaction conditions.

Other carbamate functional monomers that may be used to prepare monomers of structure III are, for instance, the reaction product of an ethylenically unsaturated hydroxyl functional monomer such as hydroxyethyl methacrylate and the like, a diisocyanate, and a hydroxyalkyl carbamate such as hydroxyethyl carbamate or hydroxypropyl carbamate.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate, which is preferred, and 4,4'-methylene-bis-(cyclohexyl isocyanate).

In one embodiment of the invention, the carbamate functional monomer is the reaction product of hydroxyethyl methacrylate, isophorone diisocyanate, and hydroxypropyl carbamate. In such a case, $R_2$ may have the structure:

of suitable aldehydes include formaldehyde, which is preferred, acetaldehyde, propanaldehyde, butyraldehyde, furfural, benzaldehyde, acrolein, methacrolein, and glyoxal. Alkylolation may be performed in an aqueous or alcoholic medium, using techniques known to those skilled in the art; for example, at temperatures of about 10 to about 100° C. in aqueous medium, and about 10 to about 170° C. in organic medium.

The alkylolated monomer may then optionally be etherified by reaction with an alcohol using conventional techniques. Suitable alcohols contain about 1 to about 6 carbon atoms and include methanol, ethanol, n-propanol, isopropanol, n-butanol, isobutanol, pentanol, and cyclohexanol. n-Butanol is preferred.

Alkylolation and etherification of the carbamate functional monomer may be done in one step by reacting the carbamate functional monomer with an aldehyde in an acidic, alcoholic medium such that the alcohol solvent which is in stoichiometric excess participates in the reaction.

The acrylic copolymers having groups of structure II may be reaction products of one or more monomers of structure III and alkyl esters of acrylic acid or methacrylic acid and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate, and 2-ethylhexyl acrylate. Suitable other polymerizable ethylenically unsaturated monomers include vinyl aromatic compound such as acrylonine and vinyl toluene; nitriles such as acrylonitrile and methacrylonitrile; vinyl and vinylidene halides such as vinyl chloride and vinylidene fluoride and vinyl esters such as vinyl acetate. The acrylic copolymers may contain small amounts (less than about 25 percent by weight based on the total weight of monomers used to prepare the copolymer) of hydroxyl functionality which can be incorporated into the acrylic copolymer through the use of hydroxyl functional monomers such as hydroxyethyl acrylate, hydroxypropyl acrylate, hydroxybutyl acrylate, hydroxyethyl methacrylate, and hydroxypropyl methacrylate which may be copolymerized with the other acrylic monomers.

The acrylic copolymer may be prepared by solution polymerization techniques in the presence of suitable initia- (IV)

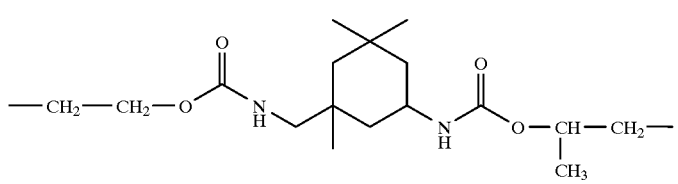

Such monomers are disclosed throughout U.S. Pat. No. 5,098,947. Still other ethylenically unsaturated carbamate functional monomers may be used, such as the reaction product of isocyanic acid (HNCO) with a hydroxyl functional acrylic or methacrylic monomer such as hydroxyethyl acrylate.

The acrylic monomer having carbamate functional groups may be alkylolated by reaction with an aldehyde. Examples tors such as organic peroxides or azo compounds, for example, benzoyl peroxide or N,N-azobis(isobutyronitrile). The polymerization may be carried out in an organic solution in which the monomers are soluble by techniques conventional in the art. Other polymerization techniques include emulsion or suspension polymerization.

As indicated above, acrylic copolymers having groups of structure II may alternatively be prepared by first forming a carbamate functional acrylic copolymer which is alkylolated with an aldehyde and optionally etherified with an alcohol. In this embodiment, the carbamate functional acrylic copolymer may be a reaction product of one or more ethylenically unsaturated carbamate functional monomers and alkyl esters of acrylic acid or methacrylic acid and, optionally, one or more other polymerizable ethylenically unsaturated monomers. Suitable monomers include those discussed above.

Carbamate groups can also be incorporated into the acrylic copolymer by reacting a hydroxyl functional acrylic polymer with a low molecular weight carbamate functional material via a transcarbamoylation process similar to the one described above in connection with the incorporation of carbamate groups into the polyesters.

Before alkylolation, the carbamate functional acrylic copolymer typically has a number average molecular weight of from about 1000 to about 10,000, preferably from about 1000 to about 5000 as determined by gel permeation chromatography using a polystyrene standard, a weight average molecular weight of from about 1500 to about 20,000, preferably from about 2000 to about 6000 as determined by gel permeation chromatography using a polystyrene standard, and a calculated carbamate equivalent weight less than about 1000, preferably within the range of about 200 to about 600, based on equivalents of reactive carbamate groups.

The carbamate functional acrylic copolymer may be alkylolated and optionally etherified using techniques discussed above in connection with carbamate functional monomers.

The acrylic copolymer is preferably present in the film-forming composition in amounts of about 10 to about 50, more preferably about 20 to about 30 percent by weight based on the total weight of resin solids in the film-forming composition. Levels greater than 50 percent may adversely affect acid etch resistance, whereas levels below 10% may adversely affect humidity resistance and exterior durability.

The curable film-forming composition also includes an aminoplast crosslinking agent (different from the acrylic copolymer of (ii) above), and containing alkylol and/or alkylol ether groups (typically methylol and/or methylol ether groups). Aminoplasts are obtained from the reaction of an aldehyde with an amine or amide. The most common amines or amides are melamine, urea, or benzoguanamine, and are preferred. However, condensates with other amines or amides can be used, for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains alkylol, usually methylol groups and preferably at least a portion of these groups are etherified with an alcohol to modify the cure response. Any monohydric alcohol may be employed for this purpose including those listed above in the preparation of the etherified acrylic copolymer.

Preferably, the aminoplasts which are used are melamine-, urea-, or benzoguanamine-formaldehyde condensates etherified with an alcohol containing from one to four carbon atoms. The aminoplast is preferably present in amounts of about 15 to about 50, more preferably about 20 to about 35 percent by weight based on the total weight of resin solids in the film-forming composition. Levels below about 15 percent by weight may compromise properties of the cured coating, such as mar resistance and hardness, whereas levels above 50% may adversely affect acid etch resistance.

Usually the film-forming composition will also preferably contain catalysts to accelerate the cure of the composition. Examples of suitable catalysts are acidic materials and include acid phosphates and sulfonic acid or a substituted sulfonic acid such as dodecylbenzene sulfonic acid or para-toluene sulfonic acid. The catalyst is usually present in an amount of about 0.5 to about 5.0 percent by weight, preferably about 1 to about 2 percent by weight, based on the total weight of resin solids in the film-forming composition.

Optional ingredients such as, for example, adjuvant resins, plasticizers, flow controllers, anti-oxidants, UV light absorbers and similar additives conventional in the art may be included in the composition. These ingredients are typically present at up to about 25 percent by weight based on the total weight of resin solids in the film-forming composition.

The film-forming composition of the present invention may contain color pigments conventionally used in surface coatings and may be used as a high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523-89 for gloss measurement and ASTM E430-91 for DOI measurement.

The film-forming composition of the present invention is preferably used as the clear coat layer in a multi-component composite coating composition such as a "color-plus-clear" coating system, which includes at least one pigmented or colored base coat and at least one clear coat. The cured multi-component coating would have the gloss and DOI values as mentioned above. The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes.

The base coat compositions may be solvent borne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described throughout U.S. Pat. No. 5,071,904 can be used as the base coat.

The base coat also contains pigments to give it color. Suitable metallic pigments include in particular aluminum flake, copper bronze flake and metal oxide coated mica. Besides the metallic pigments, the base coating compositions of the present invention may contain non-metallic color pigments conventionally used in surface coatings including inorganic pigments such as titanium dioxide, iron oxide, chromium oxide, lead chromate, carbon black, and organic pigments such as phthalocyanine blue and phthalocyanine green. In general, the pigment is incorporated into the coating composition in amounts of about 1 to about 80 percent by weight based on the total weight of coating solids. The metallic pigment is employed in amounts of about 0.5 to about 25 percent by weight based on the total weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to about 40 percent by weight of the total weight of the coating composition.

The base coating compositions can be applied to various substrates to which they adhere including wood, metals, glass, and plastics, such as any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to about 5 mils (about 0.254 to about 127 microns), preferably about 0.1 to about 2 mils (about 2.54 to about 50.8 microns) in thickness.

After application of the base coat to the substrate, a film is formed on the surface of the substrate by driving solvent, i. e., organic solvent or water, out of the base coat film by heating or by an air drying period. Preferably, the heating will only be for a short period of time, sufficient to ensure that the clear coat can be applied to the base coat without the former dissolving the base coat composition. Suitable drying conditions will depend on the particular base coat composition, and on the ambient humidity with certain waterborne compositions, but in general a drying time of from about 1 to about 5 minutes at a temperature of about 80 to about 250° F. (about 20 to about 121° C.) will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed; that is, exposed to ambient conditions for about 1 to about 20 minutes.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is heated to cure the coating layers. In the curing operation, solvents are driven off and the film-forming materials of the clear coat and the base coat are each crosslinked. The heating or curing operation is usually carried out at a temperature in the range of from 160–350° F. (71–177° C.) but if needed, lower or higher temperatures may be used as necessary to activate crosslinking mechanisms. The thickness of the clear coat is usually from about 0.5 to about 5 mils (about 12.7 to about 127 microns), preferably about 1.2 to about 3 mils (about 30.5 to about 76.2 microns).

The invention will further be described by reference to the following examples. Unless otherwise indicated, all parts are by weight.

Examples A through C illustrate the preparation of various carbamate functional polymers and etherified, alkylolated carbamate functional acrylic copolymers used in the film-forming compositions of the present invention.

EXAMPLE A

A carbamate functional polyester polymer was prepared from the following ingredients:

| Ingredients | Weight in parts |
| --- | --- |
| 3-hydroxy-2,2-dimethylpropyl 3-hydroxy-2,2-dimethyl-propanoate | 196.8 |
| deionized $H_2O$ | 10.0 |
| trimethylolpropane | 42.9 |
| butyl stannoic acid | 0.6 |
| triphenylphosphite | 0.8 |
| deionized $H_2O$ | 3.0 |
| methylhexahydrophthalic anhydride | 158.3 |
| deionized $H_2O$ | 10.0 |
| DOWANOL PM[1] | 3.0 |
| butyl stannoic acid | 0.5 |
| triphenylphosphite | 0.5 |
| DOWANOL PM | 2.0 |
| DOWANOL PM carbamate[2] (37% solution in DOWANOL PM) | 318.9 |
| DOWANOL PM | 10.0 |
| DOWANOL PM | 105.0 |

[1]1-methoxy-1-propanol, available from Dow Chemical Co.
[2]Reaction product of DOWANOL PM and urea.

The first ingredient was charged to a suitable reactor equipped with a glycol recovery column. Deionized $H_2O$ was added to the reactor as a rinse for the first ingredient. Trimethylolpropane, butyl stannoic acid, and triphenylphosphite were then added to the reactor, followed by a deionized $H_2O$ rinse. Methylhexahydrophthalic anhydride, with a subsequent deionized $H_2O$ rinse, was then added to the reactor. The reaction mixture was then heated to 77° C. and sparged with nitrogen for 20 minutes. The reaction mixture was heated to 210° C. and $H_2O$ was removed from the reactor with the nitrogen sparge. The reaction was held to an acid value of 10.2 and the batch cooled to 140° C. The intermediate resin had a hydroxyl value of 156.6. DOWANOL PM and butyl stannoic acid were added to the reactor as a slurry, followed by addition of triphenylphosphite and a DOWANOL PM rinse. DOWANOL PM carbamate in DOWANOL PM solution was added to the reactor over a period of 4 hours. During the addition, DOWANOL PM was distilled from the reactor under reduced pressure. Upon completion of the addition, a DOWANOL PM rinse was added to the reactor. The reaction was continued until DOWANOL PM evolution stopped. A sample of the copolymer (90 parts) was removed from the reactor; the remaining copolymer was diluted with DOWANOL PM. The copolymer prior to dilution had a residual hydroxyl value of 19.4 and an acid value of 8.5. After dilution, the copolymer had a measured solids content of 71.2%, a Gardner-Holt viscosity of Z1+, a number average molecular weight of 720, and a weight average molecular weight of 2220 as determined by gel permeation chromatography using a polystyrene standard. The calculated carbamate equivalent weight was 472.

EXAMPLE B

A carbamate functional acrylic copolymer was prepared from the following ingredients:

| Ingredients | Weight in grams |
|---|---|
| Charge 1 | |
| EXXATE 600[1] | 1495.0 |
| Charge 2 | |
| LUPERSOL 555M60[2] | 200.0 |
| EXXATE 600 | 200.0 |
| Charge 3 | |
| hydroxypropyl acrylate | 1200.0 |
| butyl methacrylate | 760.0 |
| methyl styrene dimer | 40.0 |
| EXXATE 600 | 200.0 |
| Charge 4 | |
| di-t-amyl peroxide | 20.0 |
| EXXATE 600 | 20.0 |
| Charge 5 | |
| butyl stannoic acid | 4.20 |
| triphenyl phosphite | 4.20 |
| Charge 6 | |
| DOWANOL PM carbamate (37% solution in DOWANOL PM) | 3148.4 |

[1]Oxohexylacetate available from Exxon Co.
[2]t-amyl peroxyacetate available from Dow Chemical Co.

Charge 1 was added to a reaction flask equipped with an agitator, a thermocouple, and a $N_2$ inlet, placed under a blanket of $N_2$, and heated to 155° C. Charges 2, 3, and 4 were each separately mixed. Charge 2 was added to the reactor over 3.5 hours. Addition of Charge 3 began 15 minute after the addition of Charge 2 and was carried out over a period of 3 hours. After the completion of Charge 3 the reaction was held at reflux for 1 hour. Charge 4 was then added over 0.5 hour and the reaction held after the completion of this charge for an additional 3 hours, then cooled to ambient temperature. The reaction flask was then equipped for simple vacuum distillation, the reaction mixture heated to 140° C, and 1935 g of solvent removed under reduced pressure. Charge 5 was then added to the reactor. Charge 6 was added to the reactor over a period of three hours. During the addition, DOWANOL PM distillate was removed from the reactor under reduced pressure. The reaction was continued until DOWANOL PM evolution stopped. The copolymer was diluted with butanol. After dilution, the copolymer had a measured solids content (110° C., 1 hr) of 65.7%, a Gardner-Holt viscosity of Z, a number average molecular weight of 2117, and a weight average molecular weight of 4926 as determined by gel permeation chromatography using a polystyrene standard. The calculated carbamate equivalent weight was 276.

EXAMPLE C

A methylolated and etherified carbamate acrylic copolymer was prepared from the following ingredients:

| Ingredients | Weight in grams |
|---|---|
| Charge 1 | |
| Carbamate functional acrylic copolymer of Example B | 613.5 |
| Charge 2 | |
| butanol | 370.7 |
| formaldehyde solution in butanol | 281.3 |
| phosphoric acid (85% solution in $H_2O$) | 3.00 |

The ingredient of Charge 1 was charged to a suitable reaction flask equipped with an agitator, thermocouple, $N_2$ inlet, condenser, and Dean Stark trap filled with butanol. The ingredients of Charge 2 were then added to the reaction flask in the order stated and then heated to reflux. The reaction was held at reflux and $H_2O$ was collected in the Dean-Stark trap. The reaction was allowed to cool to ambient after 41 ml of $H_2O$ was collected. The reaction flask was subsequently equipped for simple vacuum distillation and 448.4 g of solvent were removed from the flask under reduced pressure at a maximum temperature of 60° C. The final copolymer had a measured solids content of 63.6%(110° C., 1 hour), a Gardner-Holt viscosity of Y, a number average molecular weight of 2936, and a weight average molecular weight of 7833 as measured by gel permeation chromatography versus a polystyrene standard.

Examples 1 to 7 illustrate the preparation of various film-forming compositions in accordance with the present invention and as comparative examples. Examples 1 to 5 illustrate the preparation of film-forming compositions containing decreasing levels of aminoplast (and correspondingly increasing levels of etherified carbamate acrylic). The film-forming compositions of Examples 1 to 3 were prepared in accordance with the present invention; Examples 4 and 5 are comparative. Examples 6 and 7 are comparative in that the compositions do not contain carbamate functional polyester. The various film-forming compositions were prepared by mixing together the listed ingredients.

| | EXAMPLE | | | | | | |
|---|---|---|---|---|---|---|---|
| | 1 | 2 | 3 | 4 | 5 | 6 | 7 |
| Ingredient | Total weight in grams | Total weight in grams | Total weight in grams | Total weight in grams | Total weight in grams | Total weight in grams | Total weight in grams |
| n-amyl propionate | 20.0 | 20.0 | 20.0 | 20.0 | 20.0 | 20.0 | 20.0 |
| methyl n-amyl ketone | 25.0 | 32.0 | 35.0 | 40.0 | 41.0 | 35.0 | 24.0 |
| TINUVIN 900[1] | 1.5 | 1.5 | 1.5 | 1.5 | 1.5 | 1.5 | 1.5 |
| TINUVIN 328[2] | 1.5 | 1.5 | 1.5 | 1.5 | 1.5 | 1.5 | 1.5 |
| TINUVIN 123[3] | 1.0 | 1.0 | 1.0 | 1.0 | 1.0 | 1.0 | 1.0 |
| AEROSIL R812 dispersion[4] | 12.6 | 12.6 | 12.6 | 12.6 | 12.6 | 12.6 | 12.6 |

-continued

| | EXAMPLE | | | | | | |
|---|---|---|---|---|---|---|---|
| | 1 | 2 | 3 | 4 | 5 | 6 | 7 |
| Ingredient | Total weight in grams | Total weight in grams | Total weight in grams | Total weight in grams | Total weight in grams | Total weight in grams | Total weight in grams |
| CYMEL 1130[5] | 35.0 | 25.0 | 15.0 | 5.0 | 0 | 0 | 35.0 |
| carbamate functional polyester of example A | 50.6 | 50.6 | 50.6 | 50.6 | 50.6 | 0 | 0 |
| etherified carbamate acrylic of example C | 35.2 | 49.8 | 64.3 | 78.9 | 86.2 | 150.3 | 95.3 |
| polybutyl acrylate[6] | 0.7 | 0.7 | 0.7 | 0.7 | 0.7 | 0.7 | 0.7 |
| Dodecylbenzene sulfonic acid[7] | 1.0 | 1.0 | 1.0 | 1.0 | 1.0 | 1.0 | 1.0 |

[1]2-(2-hydroxy-benzotriazol-2-yl)-4,6-bis(methyl-1-phenylethyl)phenol available from Ciba-Geigy Corp.
[2]2-(2'-Hydroxy-3',5'-ditert-amylphenyl) benzotriazole UV light stabilizer available from Ciba-Geigy Corp.
[3]Sterically hindered tertiary amine light stabilizer available from Ciba-Geigy Corp.
[4]8 parts by weight (pbw) of a highly dispersed hydrophobic amorphous silicon dioxide available from Degussa Corporation; 50 pbw of a solution of hydroxyl functional acrylic polymer having a peak molecular weight of 8000, Mw of 9000, Mn of 3500 (determined by gel permeation chromatography using a polystyrene standard) made from 40% hydroxypropyl acrylate, 20% styrene, 19% butyl acrylate, 18.5% butyl methacrylate, 0.5% methyl methacrylate, 2% acrylic acid at 70% solids in isobutanol, xylene, and SOLVESSO 100; 48.75 pbw xylene; 1.5 pbw isobutanol; 6.75 pbw SOLVESSO 100
[5]Methylated, butylated melamine formaldehyde resin available from CYTEC Industries, Inc.
[6]Flow control agent having an Mw of about 6700 and an Mn of about 2600, made in xylene at 60% solids
[7]Solution of dodecylbenzene sulfonic acid at 70% solids in deionized water Test substrates available from ACT laboratories as Cold Roll Steel (04×12×0.32) unpolished and electrocoated with a composition available from PPG Industries, Inc., as ED 5000 were prepared for coating and acid etch testing by first spray applying a solvent borne pigmented base coat, available from PPG Industries, Inc., as DCT-6373, to the substrate at a thickness of 0.7 mils (17.8 microns) at ambient atmospheric conditions. The resulting film was dried at ambient atmospheric conditions for ninety seconds. The base coat was then immediately coated with 1.6–1.9 mils (40.6–48.3 microns) of clear coat. The clear film-forming compositions of Examples 1 to 7 and a conventional hydroxyl-aminoplast clear coat available from PPG Industries, Inc., as DCT-1002B were then applied separately wet-on-wet to eight base coated substrates.

The resultant composite coatings were cured at 285° F. (141° C.) for 25 minutes to cure both the base coat and clear coat. The panels were coated in a vertical position and baked in a horizontal position. The properties of the composite coatings are reported in Table I below.

TABLE I

| Example | DOI[1] | Gloss[2] | mar gloss[3] | Acid Etch[4] | Knoop Hardness[5] |
|---|---|---|---|---|---|
| DCT-1002B | 92 | 89 | 84 | 10 | 12.3 |
| 1 | 89 | 85 | 79 | 5–6 | 13.7 |
| 2 | 91 | 83 | 77 | 4 | 12.7 |
| 3 | 80 | 82 | 68 | 4 | 12.0 |
| 4 | 81 | 80 | 57 | 2 | 9.3 |
| 5 | 83 | 79 | 47 | 2 | 9.4 |
| 6 | 89 | 81 | 69 | 8 | 9.9 |
| 7 | 87 | 87 | 78 | 8 | 8.4 |

[1]DOI (distinction of image) measured using a Dorigon DOI meter from Hunter Lab. Higher numbers indicate better clarity.
[2]20° Gloss measured by a Glossgard II glossmeter from Pacific Scientific. Higher numbers indicate better gloss.
[3]Mar resistance of coated panels was measured using the following method: coated panels are marred by applying a dry abrasive powder cleaner (Bon Ami ™ cleanser, Faultless Starch/Bon Ami Co.) followed by ten double rubs to the surface with a wool felt cloth using a Crockmeter mar tester (available from Atlas Electric Devices Company). Gloss of marred panels is measured with a 20° BYK Gardner GLOSSGARD II Glossmeter, available from Gardner Instrument Co. The 20 degree gloss is read on the marred area of the panel after being washed with water and patted dry. The number reported is the measured gloss of the marred area.

TABLE I-continued

[4]Acid etch resistance was tested using a solution of 1.5 grams 0.1M $H_2SO_4$ per 29.8 grams deionized water. 8 drops (50 μl each) were placed on each panel which were then baked 20 minutes at 120° F. This cycle was repeated two additional times with drops placed at the same spot as the original spots for each cycle. Panels were washed with soap and cold water after third cycle. Test panels were rated for degree of etching on a scale of "0" to "10" with "0" = no visible etching and "10" = severe etching.
[5]Hardness value measured using a Tukon Microhardness Tester Model 300 from Wilson Instruments according to ASTM-D1474-92. Higher numbers indicate greater hardness.

The data reported in Table I indicates that film-forming compositions prepared in accordance with the present invention (Examples 1 to 3) demonstrate improved acid etch resistance compared to conventional hydroxyl-aminoplast type compositions and compared to compositions containing no carbamate functional polyesters (Examples 6 and 7), while maintaining acceptable gloss, DOI, hardness, and mar resistance. Compositions containing little or no aminoplast (Examples 4 and 5), while exhibiting excellent acid etch resistance, demonstrate reduced hardness and mar resistance.

We claim:

1. A curable film-forming composition comprising (i) a polyester polymer or oligomer containing a plurality of carbamate groups of the structure:

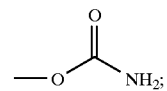

(ii) an acrylic copolymer containing a plurality of groups of the structure:

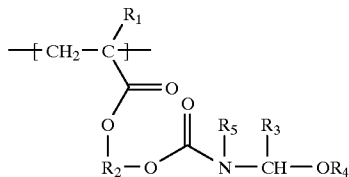

wherein $R_1$ is hydrogen or methyl, $R_2$ is a divalent linking group having about 1 to about 30 carbon atoms, $R_3$ is hydrogen or a lower alkyl group having about 1 to about 10 carbon atoms, and $R_4$ is a lower alkyl group having about 1 to about 6 carbon atoms; $R_5$ is hydrogen or

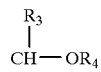

where $R_3$ and $R_4$ are as defined above; and (iii) an aminoplast crosslinking agent different from (ii) containing methylol groups, methylol ether groups, or mixtures thereof.

2. The film-forming composition of claim 1, wherein the polyester polymer or oligomer is present in the film-forming composition in amounts of about 10 to about 75 percent by weight based on the total weight of resin solids in the film-forming composition.

3. The film-forming composition of claim 1, wherein the aminoplast is present in the film-forming composition in amounts of about 15 to about 50 percent by weight based on the total weight of resin solids in the film-forming composition.

4. The film-forming composition of claim 1, wherein the acrylic copolymer is present in the film-forming composition in amounts of about 10 to about 50 percent by weight based on the total weight of resin solids in the film-forming composition.

5. The film-forming composition of claim 1, wherein prior to carbamoylation, the polyester is a reaction product of trimethylolpropane, methylhexahydrophthalic anhydride, and 3-hydroxy-2,2-dimethylpropyl 3-hydroxy-2,2-dimethylpropanoate in a 1:2.95:3.01 mole ratio.

6. The film-forming composition of claim 1, wherein $R_2$ is 1- or 2-methyl ethylene.

7. The film-forming composition of claim 1, wherein $R_3$ is hydrogen.

8. The film-forming composition of claim 1, wherein $R_4$ is a lower alkyl group having about 1 to about 4 carbon atoms.

9. A multi-component composite coating composition comprising a pigmented film-forming composition serving as a base coat and a clear film-forming composition serving as a transparent coat over the base coat wherein the transparent coat is a curable film-forming composition comprising (i) a polyester polymer or oligomer containing a plurality of carbamate groups of the structure:

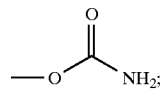

(ii) an acrylic copolymer containing a plurality of groups of the structure:

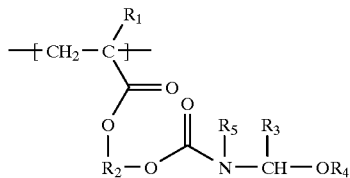

wherein $R_1$ is hydrogen or methyl, $R_2$ is a divalent linking group having about 1 to about 30 carbon atoms, $R_3$ is hydrogen or a lower alkyl group having about 1 to about 10 carbon atoms, and $R_4$ is a lower alkyl group having about 1 to about 6 carbon atoms; $R_5$ is hydrogen or

where $R_3$ and $R_4$ are as defined above; and (iii) an aminoplast crosslinking agent different from (ii) containing methylol groups, methylol ether groups, or mixtures thereof.

10. The multi-component composite coating composition of claim 9, wherein the polyester polymer or oligomer is present in the clear film-forming composition in amounts of about 10 to about 75 percent by weight based on the total weight of resin solids in the clear film-forming composition.

11. The multi-component composite coating composition of claim 9, wherein the aminoplast is present in the clear film-forming composition in amounts of about 15 to about 50 percent by weight based on the total weight of resin solids in the clear film-forming composition.

12. The multi-component composite coating composition of claim 9, wherein the acrylic copolymer is present in the clear film-forming composition in amounts of about 10 to about 50 percent by weight based on the total weight of resin solids in the clear film-forming composition.

13. The multi-component composite coating composition of claim 9, wherein prior to carbamoylation the polyester is a reaction product of trimethylolpropane, methylhexahydrophthalic anhydride, and 3-hydroxy-2,2-dimethylpropyl 3-hydroxy-2,2-dimethylpropanoate in a 1:2.95:3.01 mole ratio.

14. The multi-component composite coating composition of claim 9, wherein $R_2$ is 1- or 2-methyl ethylene.

15. The multi-component composite coating composition of claim 9, wherein $R_3$ is hydrogen.

16. The multi-component composite coating composition of claim 9, wherein $R_4$ is a lower alkyl group having about 1 to about 4 carbon atoms.

* * * * *